(12) United States Patent
Nash

(10) Patent No.: US 7,663,697 B2
(45) Date of Patent: Feb. 16, 2010

(54) SYNC-THRESHOLD ADJUST

(75) Inventor: Randolph Wm. Nash, McMinnville, OR (US)

(73) Assignee: Seiko Epson Corporation, Suwa-shi, Nagano-ken (JP)

( * ) Notice: Subject to any disclaimer, the term of this patent is extended or adjusted under 35 U.S.C. 154(b) by 747 days.

(21) Appl. No.: 11/298,074

(22) Filed: Dec. 8, 2005

(65) Prior Publication Data
US 2007/0132851 A1 Jun. 14, 2007

(51) Int. Cl.
*H04N 17/00* (2006.01)
*H04N 5/04* (2006.01)
*H03L 7/00* (2006.01)

(52) U.S. Cl. .................. 348/500; 348/180; 348/525; 348/533; 348/540; 348/607

(58) Field of Classification Search .......... 348/180, 348/193, 194, 512, 516, 518, 525, 533, 540, 348/607, 622; 375/357, 366
See application file for complete search history.

(56) References Cited

U.S. PATENT DOCUMENTS

| 5,621,475 | A | * | 4/1997 | Irie | 348/607 |
|---|---|---|---|---|---|
| 5,638,137 | A | * | 6/1997 | Thomas | 348/673 |
| 5,926,172 | A | | 7/1999 | Hanley | |
| 6,002,455 | A | | 12/1999 | Enomoto et al. | |
| 6,028,642 | A | | 2/2000 | Rinaldi et al. | |
| 6,069,667 | A | * | 5/2000 | Ueda et al. | 348/525 |
| 6,393,069 | B1 | * | 5/2002 | Shibata | 375/340 |
| 6,744,789 | B1 | | 6/2004 | Michener | |
| 6,822,675 | B2 | * | 11/2004 | Jung et al. | 348/180 |
| 6,940,561 | B1 | * | 9/2005 | Glaab et al. | 348/724 |
| 6,985,174 | B1 | * | 1/2006 | Thompson et al. | 348/180 |
| 7,110,042 | B1 | * | 9/2006 | Bradley | 348/534 |
| 7,133,481 | B2 | * | 11/2006 | Azakami et al. | 375/355 |
| 7,139,035 | B2 | * | 11/2006 | Kempf | 348/607 |
| 7,327,399 | B2 | * | 2/2008 | O'Connell | 348/465 |
| 7,463,708 | B2 | * | 12/2008 | Simmons et al. | 375/357 |
| 2006/0152626 | A1 | * | 7/2006 | Heijna | 348/532 |

OTHER PUBLICATIONS

Infocus, X2 Multi-Use User's Guide, http://www.projectorcentral.com/pdf/projector_manual_2440.

International Search Report for International Application No. PCT/US06/61767, 4 pgs.

* cited by examiner

*Primary Examiner*—Brian P Yenke
(74) *Attorney, Agent, or Firm*—Townsend and Townsend and Crew, LLP

(57) ABSTRACT

An apparatus, system, and method for determining an operational threshold level for distinguishing between video data and synchronization data in a video signal, are described herein.

21 Claims, 3 Drawing Sheets

SYNC-THRESHOLD ADJUST

FIELD

Embodiments of the present invention relate generally to the field of display devices, and more particularly to processing signals that control said display devices.

BACKGROUND

Display devices are used for presentation of video to a viewer. The video to be presented may be transmitted to the display device from a source unit in the form of a video signal. A display device receiving a video signal will render video output corresponding to data conveyed by the video signal. However, if the display device improperly interprets the video signal, which could occur, e.g., if the video signal includes excessive noise, the corresponding video output may be disrupted or compromised.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the present invention include an apparatus, method, and system for receiving a video signal and determining a threshold level for distinguishing between video data and synchronization data conveyed by the video signal.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in an embodiment" is used repeatedly. The phrase generally does not refer to the same embodiment; however, it may. The terms "comprising," "having," and "including" are synonymous, unless the context dictates otherwise.

Figure 1:
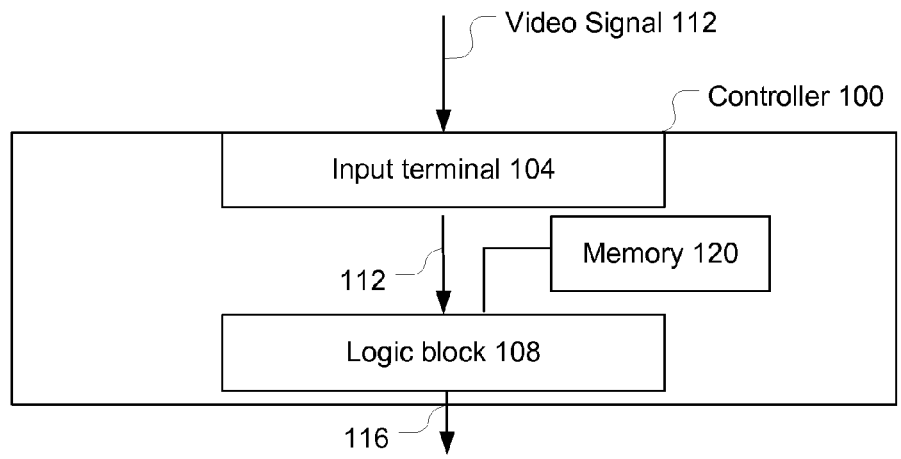
FIG. 1 illustrates a controller in accordance with an embodiment of the present invention.

FIG. 1 illustrates a controller 100 in accordance with an embodiment of the present invention. In this embodiment, the controller 100 may include an input terminal 104 and a logic block 108. The input terminal 104 may receive an incoming video signal 112, which may include both video data and synchronization data, from a source unit (not shown). In various embodiments, the synchronization data may be used to frame the video data, e.g., to convey frequency information concerning the video signal. The input terminal 104 may transmit the video signal 112 to the logic block 108 which may interpret the video signal 112, based at least in part on an operational threshold level, and output parsed video and/or synchronization data 116. The logic block 108 may determine the operational threshold level to be used for said interpretation of the video signal 112.

In various embodiments, the controller 100 may include a microcontroller, a processor, an application-specific integrated circuit, etc. The controller 100 may represent a discrete unit or a number of control elements interoperatively coupled to one another in a manner to facilitate the operation of embodiments of the present invention.

In embodiment, the logic block 108 may store the operational threshold level in a memory 120, which may be a register, e.g. a sync-slicer register, or some other type of storage structure.

Figure 2:
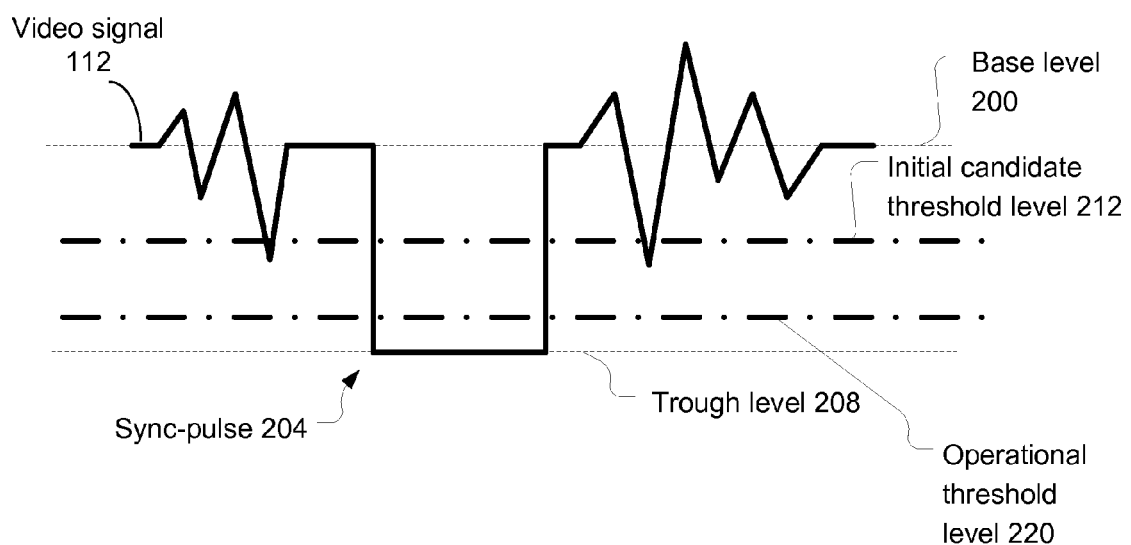
FIG. 2 illustrates a video signal in accordance with an embodiment of the present invention.

FIG. 2 illustrates a portion of the video signal 112 in accordance with an embodiment of the present invention. In an embodiment, a video standard may define anything below, e.g., 0 volts (V) as synchronization data, while anything 0V and above is video data. In this embodiment, the video signal 112 may have a base level at 0V 200, which may represent video black, and a sync-pulse 204. The sync-pulse 204 may have a trough level at −300 mV 208, for example. The trough level of a sync-pulse may be defined at different values for different embodiments.

Referring also to FIG. 1, the memory 120 may have an initial candidate threshold level 212 stored therein. As used herein a candidate threshold level may be a threshold level that has the potential to be used as the operational threshold level. The logic block 108 may use this initial candidate threshold level 212 in order to interpret a portion of the video signal 112. In particular, the logic block 108 may use the initial candidate threshold level 212 to distinguish between the video data and the synchronization data transmitted by the video signal 112.

In an embodiment, the initial candidate threshold level 212 may be a predetermined value, e.g., −150 mV. Noise, in the video data portion of the video signal 112, may spike below the initial candidate threshold level 212 and be incorrectly interpreted as synchronization data. Therefore, in an embodiment, the logic block 108 may determine the operational threshold level 220 that may be better suited for distinguishing between the video data and the synchronization data. This determination may begin when certain conditions are fulfilled without the need for a decision or action on the part of a user. In various embodiments, one or more candidate threshold levels may be set prior to determination of the operational threshold level 220, as will be described in more detail below.

Figure 3:
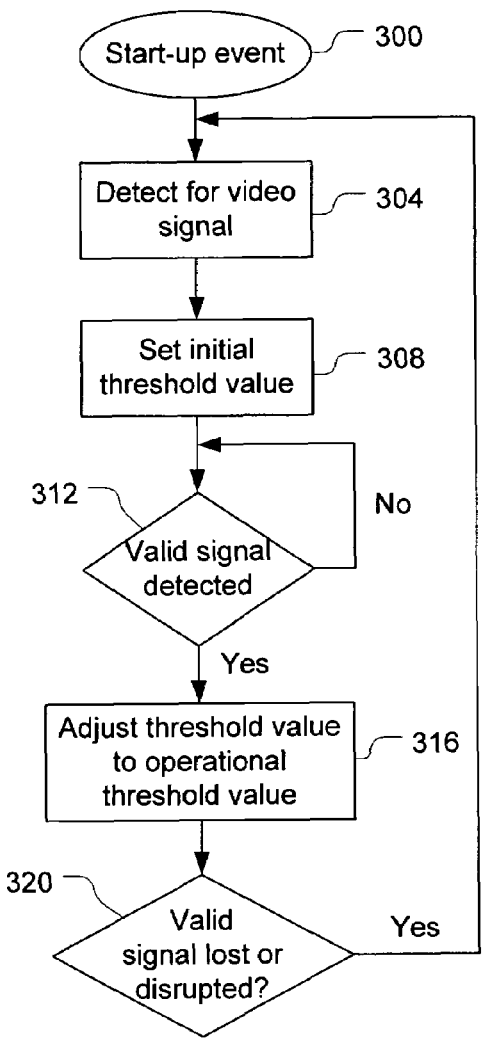
FIG. 3 illustrates a determination of an operational threshold level in accordance with an embodiment of the present invention.

FIG. 3 illustrates a determination of an operational threshold level in accordance with an embodiment of the present invention. In this embodiment a start-up event may initiate the determination 300. The start-up event may be, for example, a power-on event, an incorrect interpretation of the video signal, a loss of the video signal, etc. Following the start-up event, a logic block may detect for a video signal 304. Once a video signal is detected, an initial candidate threshold level may be set 308. The initial candidate threshold level may be set to a predetermined starting value, it may be set to a most recently used threshold level, or to some other value. With the initial candidate threshold level in place, the logic block may detect for a valid video signal 312, e.g., by periodic detection of sync-pulses. Once a valid signal is detected, the logic block may adjust the initial candidate threshold level to an operational threshold level to be used for the interpretation of the video signal 316. The video signal may be monitored for a loss or disruption 320, which may result in the process looping back to the detection phase 304.

In an embodiment, an adjustment of an initial candidate threshold level to an operational threshold level may be effectuated by setting a number of candidate threshold levels and interpreting the video signal based at least in part on the candidate threshold levels. This may be done, for example, to determine at least an approximation of the trough level of the sync-pulses. A logic block may use the at least approximately determined trough level as a basis for setting the operational threshold level. For example, an operational threshold level that is set at a value slightly above the at least approximately determined trough level may facilitate consistent detection of the sync-pulses while maintaining an adequate distance from any noise in the video data portion of the video signal.

Figure 4:
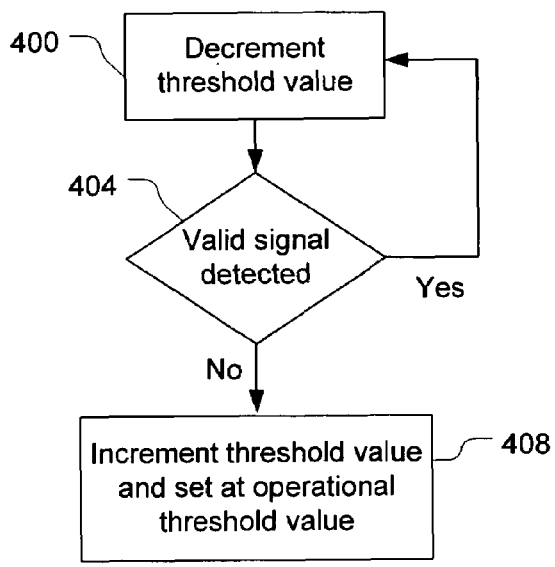
FIG. 4 illustrates an adjustment of a candidate threshold level in accordance with an embodiment of the present invention.

FIG. 4 illustrates an adjustment of a candidate threshold level in accordance with an embodiment of the present invention. In this embodiment, a candidate threshold level may be decremented by a certain value, n 400. A valid signal may be detected for based at least in part on the candidate threshold level 404. If a valid signal is detected, the candidate threshold level may be decremented again 400. If no valid signal is detected, the candidate threshold level may be incremented by the value n, or some other value, and set as the operational threshold level 408.

Figure 5:
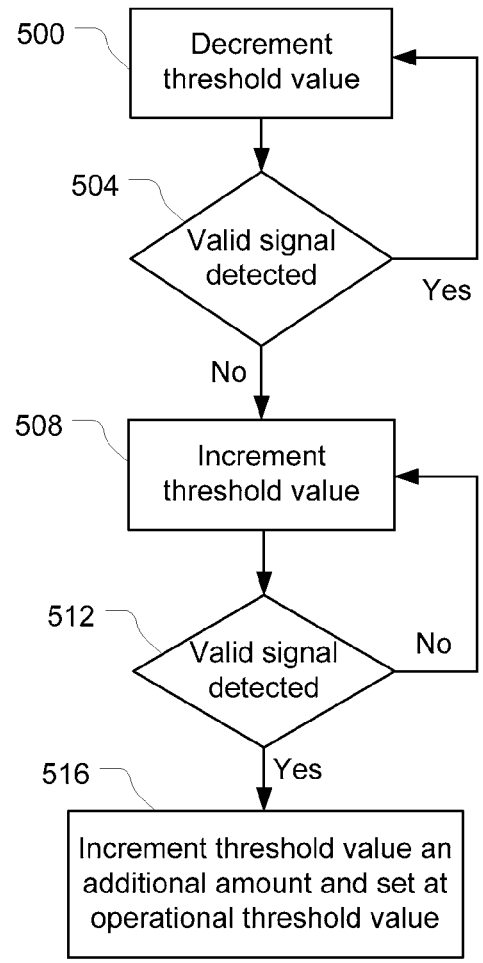
FIG. 5 illustrates an adjustment of a candidate threshold level in accordance with an embodiment of the present invention.

FIG. 5 illustrates an automatic adjustment of a threshold level in accordance with an embodiment of the present invention. In this embodiment, a threshold level may be decremented by a certain value, n 500. A valid signal may be detected for based at least in part on the candidate threshold level 504. If a valid signal is detected, the candidate threshold may be decremented again 500. In this embodiment, if no valid signal is detected, the candidate threshold level may be incremented by a value m, which is less than n 508 and the valid signal may be detected for 512. If no valid signal is detected, the candidate threshold level may be incremented by m again 508. In this manner, the incremental candidate threshold levels may be used to determine at least an approximation of the trough value. The smaller m is, the more closely the trough value may be determined.

Once the candidate threshold level is set greater than the trough value, a valid signal may, once again, be detected. At this point, the candidate threshold level may be incremented an additional amount and set at the operational threshold level 516. This additional amount may be designed to distance the operational threshold level from the trough level by an acceptable amount.

While the above embodiments involve an adjustment of the threshold level including decrementing candidate threshold levels until the sync-pulses are lost, other embodiments may include setting an initial candidate threshold level below an expected trough level of the sync-pulses and subsequently incrementing the threshold levels to determine an approximation of the trough level.

There may be any number of different implementations to practice the concepts of the embodiments of the present invention.

Figure 6:
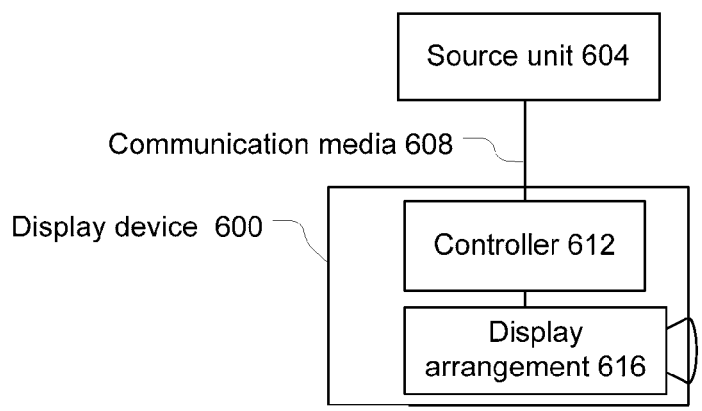
FIG. 6 illustrates a system in accordance with an embodiment of the present invention.

FIG. 6 illustrates a system including a display device 600 and a source unit 604 in accordance with an embodiment of the present invention. In this embodiment, the source unit 604 may provide the display device 600 with a video signal, having both video data and synchronization data, over communication media 608. The display device 600 may include a controller 612 to receive the video signal. Upon receipt of the video signal the controller 612, which may be similar to the controller 100 discussed above, may determine an operational threshold level to be used in distinguishing between the video data and the synchronization data included in the video signal. The controller 612 may, in turn, be coupled to a display arrangement 616 and may control the display arrangement 616 in a manner to effectuate the rendering of video corresponding to the video data carried on the video signal, for output.

For the purpose of this description, a still image may be considered as a degenerate or special video where there is only one frame. Accordingly, both still image and video terminologies may be used in the description, and they are not to be construed to limit the embodiments of the present invention to the rendering of one or the other.

In various embodiments, the source unit 604 may be, but is not limited to, a digital versatile disk player, a set-top box, or an integrated television tuner.

In various embodiments, the communication media 608 may be, but is not limited to, one or more communication lines, e.g., coaxial cables. In an embodiment the video signal may be a component video signal with separate communication lines for portions of the video signal. For example, a component video signal may be transmitted along three different communication lines including, e.g., two lines for chrominance data, and a line for luminance data. In this embodiment the synchronization data may be embedded in a blanking period on the luminance data line. An embodiment embedding the synchronization data on the luminance data line may be commonly referred to as sync-on-green.

The video signal may be in any of a number of formats including, but not limited to, high-definition television, enhanced-definition television formats, or standard-definition television formats.

In various embodiments, the display device 600 may be, but is not limited to, a projection device, a plasma display, a cathode-ray tube display, or a liquid-crystal display.

Although specific embodiments have been illustrated and described herein for purposes of description, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A circuit comprising:
an input terminal configured to receive a video signal including video data and synchronization data, wherein the synchronization data includes a plurality of synchronization pulses; and
a logic block coupled to the input terminal and configured to determine an operational threshold level for distinguishing between the video data and the synchronization data of the video signal, by being configured to:
successively decrement a current candidate threshold level until the current candidate threshold level is below trough levels of one or more synchronization pulses;
subsequent to completion of said successively decrementing, successively increment the current candidate threshold level until the current candidate threshold level results in consistent detection of a number of synchronization pulses of the plurality of synchronization pulses; and
subsequent to completion of said successively incrementing, set the operational threshold level to the current candidate threshold level.

2. The circuit of claim 1, wherein the logic block is further configured to determine the operational threshold level by successively setting one or more candidate threshold levels and interpreting the video signal under each of the one or more candidate threshold levels.

3. The circuit of claim 2, wherein said successive setting comprises setting a first one of the one or more candidate threshold levels to a predetermined level and setting subsequent one or ones of the one or more candidate threshold levels, if any, based at least in part on one or more preceding interpretations of the video signal.

4. The circuit of claim 1, wherein each of the plurality of synchronization pulses has substantially a same trough level, and the logic block is configured to at least approximately determine the trough level and determine the operational threshold level based at least in part on the at least approximately determined trough level.

5. The circuit of claim 4, wherein the logic block is configured to at least approximately determine the trough level by successively setting one or more candidate threshold levels by successively decrementing each current candidate threshold level until the current candidate threshold level is below the trough level.

6. The circuit of claim 5, wherein the logic block is further configured to switch said successive setting to successively incrementing each current candidate threshold level until the current candidate threshold level results in consistent detection of a number of synchronization pulses of the plurality of synchronization pulses.

7. The circuit of claim 6, further comprising setting the operational threshold level to the current candidate threshold level resulting in the consistent detection.

8. A method comprising:
receiving, by an input terminal, a video signal including video data, wherein the synchronization data includes a plurality of synchronization pulses; and synchronization data;
determining, with a logic block, an operational threshold level for distinguishing between the video data and the synchronization data of the video signal, said determining the operational threshold level further comprises:
successively decrementing a current candidate threshold level until the current candidate threshold level is below trough levels of one or more synchronization pulses;
subsequent to completion of said successively decrementing, successively incrementing the current candidate threshold level until the current candidate threshold level results in consistent detection of a number of synchronization pulses of the plurality of synchronization pulses; and
subsequent to completion of said successively incrementing, setting the operational threshold level to the current candidate threshold level.

9. The method of claim 8, wherein said determining of an operational threshold level further comprises:
successively setting one or more candidate threshold levels; and
interpreting the video signal under each of the one or more candidate threshold levels.

10. The method of claim 9, wherein said successively setting of one or more candidate threshold levels comprises:
setting a first one of the one or more candidate threshold levels to a predetermined level; and
setting subsequent one or ones of the one or more candidate threshold levels, if any, based at least in part on one or more preceding interpretations of the video signal.

11. The method of claim 8, wherein each of the plurality of synchronization pulses has substantially a same trough level and the method further comprises:
determining at least an approximation of the trough level; and
determining the operational threshold level based at least in part on said determining of at least the approximation of the trough level.

12. The method of claim 8, wherein said determining of at least an approximation of the trough level comprises:
successively setting one or more candidate threshold levels by successively decrementing each current candidate threshold level until the current candidate threshold level is below the trough level.

13. The method of claim 12, further comprising:
switching said successive setting to successively incrementing each current candidate threshold level unit the current candidate threshold level results in consistent detection of a number of synchronization pulses of the plurality of synchronization pulses.

14. The method of claim 8,
wherein said successively decrementing further comprises successively decrementing the current candidate threshold level by a first value;
wherein said successively incrementing further comprises successively incrementing the current candidate threshold level by a second value; and
wherein the second value is smaller than the first value.

15. A system comprising:
a source unit configured to output a video signal including video data and synchronization data, wherein the synchronization data includes a plurality of synchronization pulses;
a display device coupled to the source unit and configured to output a video based at least in part on the video signal, the display device including:
an input terminal configured to receive the video signal; and
a logic block coupled to the input terminal and configured to determine an operational threshold level for distinguishing between the video data and the synchronization data of the video signal, by being configured to:
successively decrement a current candidate threshold level until the current candidate threshold level is below trough levels of one or more synchronization pulses;

subsequent to completion of said successively decrementing, successively increment the current candidate threshold level until the current candidate threshold level results in consistent detection of a number of synchronization pulses of the plurality of synchronization pulses; and subsequent to completion of said successively incrementing, set the operational threshold level to the current candidate threshold level.

16. The system of claim 15, wherein the logic block is further configured to determine the operational threshold level by successively setting one or more candidate threshold levels and interpreting the video signal under each of the one or more candidate threshold levels.

17. The system of claim 15, wherein each of the plurality of synchronization pulses has substantially a same trough level, and the logic block is configured to at least approximately determine the trough level and determine the operational threshold level based at least in part on the at least approximately determined trough level.

18. The system of claim 17, wherein the logic block is configured to at least approximately determine the trough level by successively setting one or more candidate threshold levels by successively decrementing each current candidate threshold level until the current candidate threshold level is below the trough level.

19. The system of claim 18, wherein the logic block is further configured to
switch said successive setting to successively incrementing each current candidate threshold level until the current candidate threshold level results in consistent detection of a number of synchronization pulses of the plurality of synchronization pulses.

20. The system of claim 15, wherein the video signal is a component video signal and the system further comprises:
a plurality of communication lines configured to couple the source unit to the display device.

21. The system of claim 15, wherein the source unit is a unit selected from the group consisting of a set-top box, a digital versatile disk player, and an integrated television tuner.

* * * * *

UNITED STATES PATENT AND TRADEMARK OFFICE
CERTIFICATE OF CORRECTION

| | |
|---|---|
| PATENT NO. | : 7,663,697 B2 |
| APPLICATION NO. | : 11/298074 |
| DATED | : February 16, 2010 |
| INVENTOR(S) | : Randolph Wm. Nash |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1103 days.

Signed and Sealed this

Thirtieth Day of November, 2010

David J. Kappos
*Director of the United States Patent and Trademark Office*